(12) United States Patent
Zhang et al.

(10) Patent No.: US 8,019,147 B2
(45) Date of Patent: Sep. 13, 2011

(54) THREE-DIMENSIONAL DATA REGISTRATION METHOD FOR VISION MEASUREMENT IN FLOW STYLE BASED ON DOUBLE-SIDED TARGET

(75) Inventors: Guangjun Zhang, Beijing (CN); Junhua Sun, Beijing (CN); Zhenzhong Wei, Beijing (CN); Qianzhe Liu, Beijing (CN)

(73) Assignee: Beihang University (CN)

( * ) Notice: Subject to any disclaimer, the term of this patent is extended or adjusted under 35 U.S.C. 154(b) by 843 days.

(21) Appl. No.: 12/025,741

(22) Filed: Feb. 4, 2008

(65) Prior Publication Data
US 2008/0298673 A1    Dec. 4, 2008

(30) Foreign Application Priority Data

May 30, 2007  (CN) .......................... 2007 1 0099771

(51) Int. Cl.
*G06K 9/00*   (2006.01)
(52) U.S. Cl. ........................ 382/154; 382/106
(58) Field of Classification Search ............... 382/106, 382/154
See application file for complete search history.

(56) References Cited

U.S. PATENT DOCUMENTS

| | | | | |
|---|---|---|---|---|
| 6,556,783 B1 * | 4/2003 | Gelphman | ...................... | 396/20 |
| 7,177,740 B1 * | 2/2007 | Guangjun et al. | .............. | 701/34 |
| 7,605,817 B2 * | 10/2009 | Zhang et al. | .................. | 345/473 |
| 7,742,635 B2 * | 6/2010 | Rohaly et al. | ................. | 382/154 |
| 7,812,871 B2 * | 10/2010 | Takemoto et al. | ............ | 348/286 |

\* cited by examiner

*Primary Examiner* — Gregory M Desire

(74) *Attorney, Agent, or Firm* — Workman Nydegger

(57) ABSTRACT

The present disclosure is directed to a three-dimensional data registration method for vision measurement in flow style based on a double-sided target. An embodiment of the disclosed method that comprises A. Setting up two digital cameras which can observe the entire measured object; B. Calibrating intrinsic parameters and a transformation between the two digital camera coordinate frames; C. A double-sided target being placed near the measured area of the measured object, the two digital cameras and a vision sensor taking images of at least three non-collinear feature points of the double-sided target; D. Removing the target, measuring the measured area by using the vision sensor; E. Respectively computing the three dimensional coordinates of the feature points in the global coordinate frame and in the vision sensor coordinate frame; F. Estimating the transformation from the vision sensor coordinate frame to the global coordinate frame through the three dimensional coordinates of the three or more non-collinear feature points obtained at step E, then transforming the three dimensional data of the measured area to the global coordinate frame; and G. Repeating step C, D, E, F, then completing three dimensional data registration for all measured areas. The present disclosure improves three dimensional data registration precision and efficiency.

5 Claims, 4 Drawing Sheets

THREE-DIMENSIONAL DATA REGISTRATION METHOD FOR VISION MEASUREMENT IN FLOW STYLE BASED ON DOUBLE-SIDED TARGET

CROSS-REFERENCE TO RELATED APPLICATIONS

This application claims priority from Chinese Patent Application Serial No. 200710099771.0 filed May 30, 2007, the disclosure of which, including the specification, drawings and claims, is incorporated herein by reference in its entirety.

TECHNICAL FIELD

The present disclosure relates to a three-dimensional vision measurement technology. More particularly, the present disclosure relates to a three-dimensional data registration method for vision measurement in a flow style based on double-sided target.

BACKGROUND

A three-dimensional profile measurement for a large-scale object is an advanced product-checking means as well as a foundation technology for modern reverse engineering, digitized designing and manufacturing. Therefore, the technology of three-dimensional profile measurement is extensively applied in the manufacturing field. Vision inspection technology, as one of nowadays advanced technologies, achieves great progress on the basis of maturity and perfection in technologies such as electronics, photoelectric detection, image processing and computer. With its increasing application in three-dimensional profile measurement, more and more scholars have been dedicating their research into the vision inspection technology field.

In practical engineering, in order to measure a whole three-dimensional profile of an object, the object is usually subdivided into many sub-areas. These sub-areas are respectively measured by a vision sensor from various viewpoints. The obtained three-dimensional data of the sub-areas are in local coordinate frames. So the three-dimensional data of the sub-areas must be unified to a global coordinate frame, and this process is called three-dimensional data registration.

At present, the three-dimensional data registration method, in common use, adopts a mark points method. First, a number of mark points are attached on the whole surface of a measured object, and one or more high precision baseline rulers are placed near the measured object. Second, a high resolution digital camera takes images of these mark points and baseline rulers from various viewpoints. Then, the extrinsic parameters of the digital camera from various viewpoints are calibrated by the mark points and baseline rulers, thus a global coordinate frame is established. At the same time, three-dimensional coordinates of all the mark points in the global coordinate frame are easily acquired. Additionally, the vision sensor measures three-dimensional coordinates of the mark points in the local coordinate frame when it measures the local sub-areas. Finally, all the local three-dimensional data are unified in the global coordinate frame through the three-dimensional coordinates of these mark points in the local and global coordinate frames, and then the three-dimensional data registration is completed. In foreign countries, the Tritop System, developed by the Gom company in Germany, is a typical product for three-dimensional vision measurement data registration using mark points. In China, Beijing Tianyuan 3D Science & Technology Co., Ltd. also develops similar products.

The disadvantages of the above-mentioned three-dimensional data registration method include the following:

Certain numbers of mark points should be attached on the surface of a measured object before measuring, which should be cleaned away during a time after measurement. The processes of attaching and cleaning mark points are fairly complicated and time-consuming.

For a measured object having a large degree of curvature, the attached mark points on the surface will be seriously deformed which will affect mark points extracting precision in images, or the mark points may not be extracted at all, or even the mark points can't be observed by the global measurement system.

High resolution digital cameras need to take images of all the mark points from various viewpoints, and the extrinsic parameters between adjacent viewpoints need to be calibrated step by step. Hence there exists accumulative errors. The disadvantages of this method lie in its complicated operation and its low efficiency.

SUMMARY

In consideration of the above-mentioned disadvantages, the present disclosure mainly aims at providing a three-dimensional data registration method for vision measurement in flow style based a on double-sided target with the advantages of high precision and efficiency.

In order to accomplish the above aim, according to one exemplary embodiment of the present disclosure, there is provided a three-dimensional data registration method for vision measurement in flow style based on a double-sided target comprising:

A. Setting up two digital cameras which can observe the entire measured object;

B. Calibrating intrinsic parameters and a transformation between coordinate frames of the two digital camera, then establishing a global coordinate frame;

C. A double-sided target is placed near a measured area of the measured object, and the two digital cameras and a vision sensor taking images of at least three non-collinear feature points of the double-sided target;

D. Removing the target, measuring the measured area using the vision sensor;

E. Respectively computing three-dimensional coordinates in the global coordinate frame of at least three feature points in the images taken by the two digital cameras and in the vision sensor coordinate frame of at least three feature points in the images taken by the vision sensor;

F. Estimating the transformation from the vision sensor coordinate frame to the global coordinate frame through the three-dimensional coordinates of three or more non-collinear feature points obtained at step E, then transforming the three-dimensional data of the measured area to the global coordinate frame; and G. Repeating step C, D, E and F, then completing three-dimensional data registration for all measured areas.

Wherein, at least three feature points are set up on each work plane of the double-sided target and a position relationship of all the feature points on both sides is known.

Wherein, the above-mentioned global coordinate frame is one of the two camera coordinate systems.

The present disclosure uses a double-sided target as an intermediary to carry out three-dimensional data registration without the necessity to attach mark points on the surface of the measured object. Therefore, this method effectively protects the measured object and avoids the trivial process of attaching mark points. The disclosure adopts a double-sided target which enables this method, without being limited by factors such as curvature, shape and materials. Thus it could be applied to the global measurement of all kinds of measured objects. Furthermore, since the global coordinate frame is fixed and the two digital cameras do not need to move from one position to another, this method eliminates accumulative errors, and thus ensures the high precision, simple operation and high efficiency of the global measurement.

BRIEF DESCRIPTION OF THE DRAWINGS

The accompanying drawings, which are incorporated in and constitute a part of specification, illustrate an exemplary embodiment of the present disclosure and, together with the general description given above and the detailed description of the embodiment given below, serve to explain the principles of the present disclosure.

DETAILED DESCRIPTION

Figure 1:
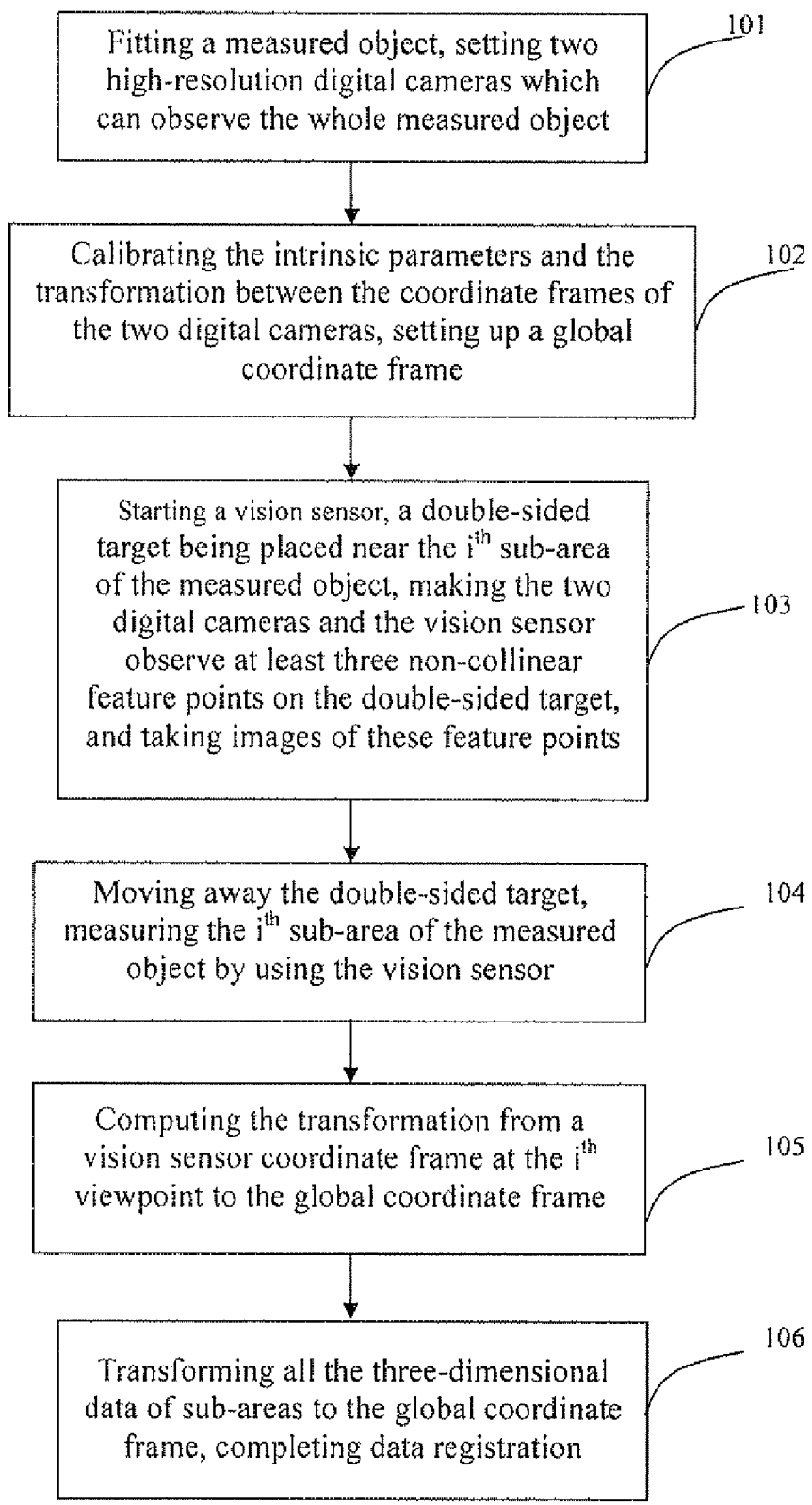
FIG. 1 is a flowchart of a three-dimensional data registration method for vision measurement in flow style based on a double-sided target.

While the claims are not limited to the illustrated embodiments, an appreciation of various aspects of the present disclosure is best gained through a discussion of various examples thereof. Referring now to the drawings, illustrative embodiments will be described in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description.

One aspect of the present disclosure is that three-dimensional data of a local area obtained by a vision sensor are registered through two high resolution digital cameras and a double-sided target. The operation is simple and the efficiency is high.

A three-dimensional data registration method of the present disclosure comprising:

At step 101 the method includes fixing a measured object and setting up two high resolution digital cameras which can observe the entire measured object. In accordance with one aspect of the embodiment, all the detail of the measuring object does not need to be observed by the two digital cameras. At least three feature points on the double-sided target set up near the measured object are observed by the two digital cameras where a vision sensor measures the object to obtain three-dimensional data.

At step 102 the method includes calibrating the intrinsic parameters of the two digital cameras. The method of calibration refers to an article by "Z. Y. Zhang, entitled, "A flexible new technique for camera calibration[R] (Microsoft Corporation, NSR-TR-98-71, 1998)". At the same time, the transformation matrix $T_{lr}$ between the coordinate systems of the two digital cameras is calibrated by the method that refers to an article by Luo Ming, entitled "Study on Multi-Sensor Machine Vision gauging System and Its Application [D], doctoral dissertation of Tianjin University, 1996", then, setting up one of the digital camera coordinate frames as a global coordinate frame which is denoted by $O_g X_g Y_g Z_g$.

At step 103 the method includes connecting the vision sensor to a computer, switching on the power of the sensor, starting the computer, and running the program of the measurement system. The measured object is subdivided into a certain number of to-be-measured sub-areas. When measuring the $i^{th}$ sub-area, the vision sensor is moved to the $i^{th}$ viewpoint. The double-sided target is placed near the measured area which enables the two digital cameras and the vision sensor to observe at least three non-collinear feature points on the target. Then, the two digital cameras and the vision sensor take images of the feature points. If the vision sensor and the digital cameras are located on the same side of the double-sided target, images of the feature points on the same side of the target are taken. Otherwise images of the feature points on the different sides of the target are taken respectively.

Respectively, computing the three-dimensional coordinates in the global coordinate frame of at least three feature points in images taken by the digital cameras and at the vision sensor coordinate frame of at least three feature points in the images taken by the vision sensor. The transformation from the vision sensor coordinate frame at the $i^{th}$ viewpoint to the global coordinate frame is estimated through the fixed transformation of the three-dimensional coordinates of non-collinear feature points in different coordinate frames, and then the three-dimensional data obtained by the vision sensor are transformed in the global coordinate frame.

Figure 2:
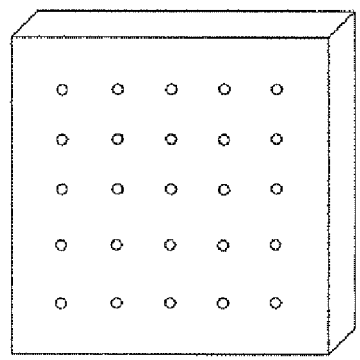
FIG. 2 illustrates a double-sided target in accordance with an embodiment of the present disclosure.
Figure 3:
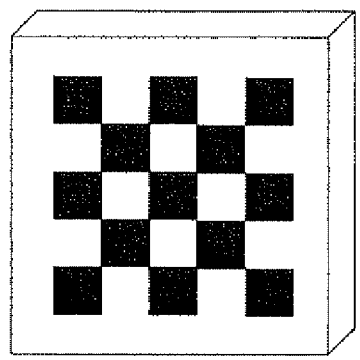
FIG. 3 illustrates another double-sided target in accordance with an embodiment of the present disclosure.
Figure 4:
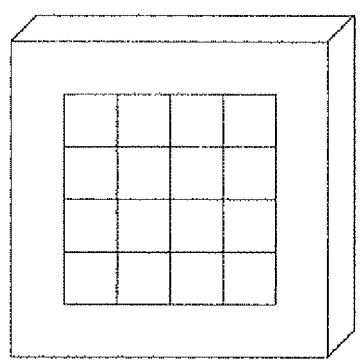
FIG. 4 illustrates a third double-sided target in accordance with an embodiment of the present disclosure.

The double-sided target is described as follows. FIG. 2, FIG. 3 and FIG. 4 illustrate double-sided targets. As shown in FIG. 2, FIG. 3 and FIG. 4, there are at least three non-collinear feature points on each side of the respective targets. The coordinates of the feature points on two sides of the targets are known, and the position relationship between all the feature points on the two sides is invariable. These feature points can also be set up in irregular style. In order to simplify describing the present disclosure, the mode that the feature points on the two sides are symmetrical is adopted. In the present disclosure, as shown in FIG. 2, the centers of circles are feature points. As shown in FIG. 3, the corners of squares are feature points. And as shown in FIG. 4, the cross points of the '+' marks are feature points. There are 3-200 feature points on each work plane of the target, and it must be ensured that at least three feature points on each side should be non-collinear.

At step 104 the method includes keeping the vision sensor at the original position, and moving away the double-sided target. Then, the vision sensor measures the $i^{th}$ sub-area of the measured object.

At step 105 the method includes computing the transformation matrix $T_{gi}$ from the vision sensor coordinate frame $O_i X_i Y_i Z_i$ at the $i^{th}$ viewpoint to the global coordinate frame $O_g X_g Y_g Z_g$ through three-dimensional coordinates at the vision sensor coordinate frame and the global coordinate frame of at least three non-collinear feature points in images taken by the digital cameras and the vision sensor. The specific transformation method can be referred to 'Machine vision' written by Zhang Guangjun and published by Science Press in June 2005 (ISBN: 7-03-014717-0, Pages: 21-22).

At step 106 the method includes transforming the three-dimensional data measured by the vision sensor at the i$^{th}$ measured area to the global coordinate frame. In a full measurement process, once the global coordinate frame is established, it would not be changed. The global coordinate frame of the present disclosure can be arbitrarily set up. In order to simplify the handling process, either of the two digital camera coordinate frames can be taken as the global coordinate frame.

At step 107 the method includes repeating steps 103~106, transforming all the three-dimensional data of sub-areas measured by the vision sensor to the global coordinate frame $O_g X_g Y_g Z_g$, then the measurement data registration is completed.

Figure 5:
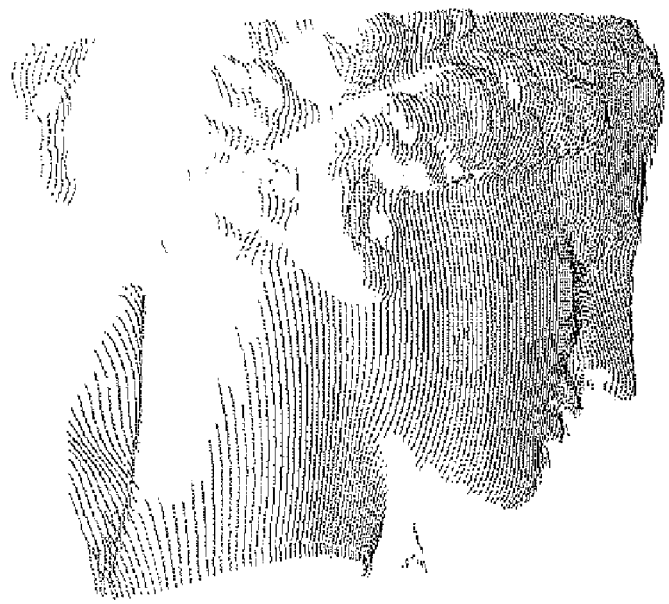
FIG. 5 illustrates measurement results of a certain area obtained by a vision sensor from a certain viewpoint.
Figure 6:
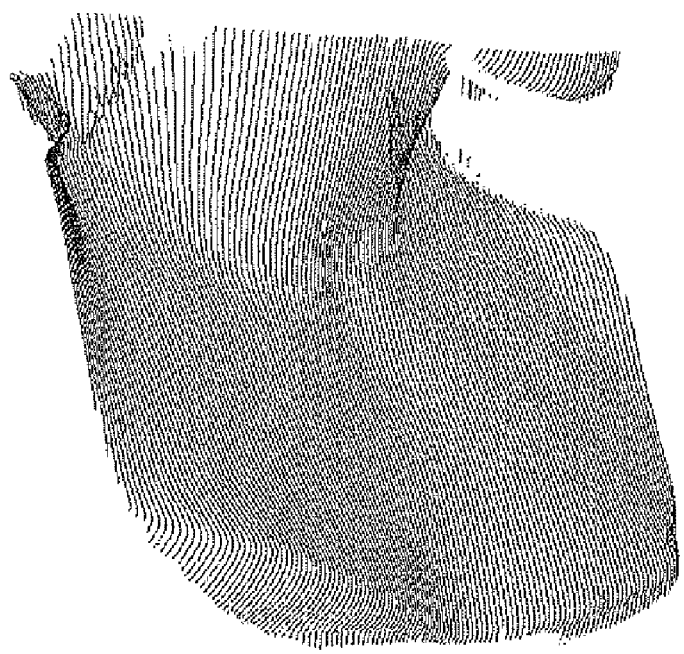
FIG. 6 illustrates measurement results of another area obtained by a vision sensor from another viewpoint.
Figure 7:
FIG. 7 illustrates registration results of a local measurement data shown in FIG. 5 and FIG. 6.

An embodiment will be shown as follow to explain the registration method of the present disclosure. Two Nikon D2Xs digital cameras and a vision sensor are used to measure a Venus plaster statue with a height of about 500 mm. A double-sided target with 5 rows and 5 columns circular apertures as feature points on each side is adopted. The distance between two adjacent circular apertures along the transverse direction or lengthwise direction is 50 mm, and their precisions are 0.005 mm. FIG. 5 and FIG. 6 respectively illustrates the measurement results of two different measured areas. The three-dimensional data are transformed at a global coordinate frame through the coordinate transformation matrix. FIG. 7 illustrates the registration result is automatically generated.

The foregoing description of various embodiments of the disclosure has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the disclosure and its practical application to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A three-dimensional data registration method for vision measurement in a flow style based on a double-sided target comprises:
   A. Setting up two digital cameras which can observe an entire measured object;
   B. Calibrating intrinsic parameters and a transformation relation between the two digital camera coordinate systems, then establishing a global coordinate system;
   C. A double-sided target being placed near a measured area of the measured object, and the two digital cameras and a vision sensor taking images of at least three non-collinear feature points of the double-sided target;
   D. Removing the double-sided target, measuring the measured area using the vision sensor;
   E. Respectively computing three dimensional coordinates of points in the global coordinate system of at least three feature points in the images taken by the two digital cameras and in the vision sensor coordinate system of at least three feature points in the images taken by the vision sensor;
   F. Estimating a transformation relation from the vision sensor coordinate system to the global coordinate system through the three-dimensional coordinates of three or more non-collinear feature points obtained at step E, then transforming the three-dimensional data of the measured area to the global coordinate system; and
   G. Repeating step C, D, E and F, then completing three-dimensional data registration for all measured areas.

2. The method according to claim 1, wherein at least three non-collinear feature points are set up on each work plane of the double-sided target.

3. The method according to claim 2, wherein a position relationship between all the feature points on the double-sided target is known.

4. The method according to claim 1, wherein a position relationship between all the feature points on the double-sided target is known.

5. The method according to claim 1, wherein the global coordinate system is one of the two digital camera coordinate systems.

\* \* \* \* \*